(12) United States Patent
Mildner et al.

(10) Patent No.: US 10,167,020 B2
(45) Date of Patent: Jan. 1, 2019

(54) ROOF SEGMENT FOR A VEHICLE AND METHOD FOR PRODUCING A ROOF SEGMENT

(71) Applicant: GM GLOBAL TECHNOLOGY OPERATIONS LLC, Detroit, MI (US)

(72) Inventors: Udo Mildner, Ruesselsheim (DE); Lothar Teske, Aschaffenburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/041,361

(22) Filed: Feb. 11, 2016

(65) Prior Publication Data

US 2016/0229458 A1    Aug. 11, 2016

(30) Foreign Application Priority Data

Feb. 11, 2015    (DE) .................... 10 2015 001 808

(51) Int. Cl.
| | | |
|---|---|---|
| *B62D 25/06* | (2006.01) | |
| *B21C 37/08* | (2006.01) | |
| *B21C 23/08* | (2006.01) | |
| *B21D 22/02* | (2006.01) | |
| *B21D 47/01* | (2006.01) | |
| *B21D 53/88* | (2006.01) | |
| *B21D 26/033* | (2011.01) | |

(52) U.S. Cl.
CPC ............ *B62D 25/06* (2013.01); *B21C 23/085* (2013.01); *B21C 37/0803* (2013.01); *B21D 22/022* (2013.01); *B21D 47/01* (2013.01); *B21D 53/88* (2013.01); *B21D 26/033* (2013.01)

(58) Field of Classification Search
CPC ... B62D 25/06; B21C 23/085; B21C 37/0803; B21D 22/022; B21D 47/01; B21D 53/88
USPC ......................................................... 296/210
See application file for complete search history.

(56) References Cited

U.S. PATENT DOCUMENTS

| | | | |
|---|---|---|---|
| 6,245,415 B1 * | 6/2001 | Keller ................. | B29C 45/0025 296/187.01 |
| 6,299,244 B1 | 10/2001 | Tarahomi | |
| 6,779,835 B2 * | 8/2004 | Fox .......................... | B60R 21/04 296/187.05 |
| 7,596,924 B2 | 10/2009 | Sakae | |

(Continued)

FOREIGN PATENT DOCUMENTS

| | | |
|---|---|---|
| DE | 19756459 A1 | 6/1999 |
| DE | 102004029737 A1 | 1/2006 |

(Continued)

OTHER PUBLICATIONS

German Patent Office, German Search Report for German Application No. 102015001808.6, dated Nov. 3, 2015.

*Primary Examiner* — Joseph D Pape
(74) *Attorney, Agent, or Firm* — Lorenz & Kopf, LLP (57) ABSTRACT

A roof segment for a vehicle, particularly a motor vehicle, wherein the roof segment has a flat base element with a wall, wherein the wall is created from a single, plastically deformed starting material, forms a closed hollow cross section, and encloses one or more cavities. The invention further relates to a method for producing a roof segment that may include plastic deformation of a single starting material to produce a blank that has a wall with a closed hollow cross section, and hotforming the blank to produce the flat base element.

20 Claims, 5 Drawing Sheets

(56) References Cited

U.S. PATENT DOCUMENTS

| | | |
|---|---|---|
| 7,954,878 B1 | 6/2011 | Hinton |
| 7,997,643 B2 | 8/2011 | Shah et al. |
| 2015/0115665 A1* | 4/2015 | Joyce .................. B21D 11/10 |
| | | 296/210 |

FOREIGN PATENT DOCUMENTS

| | | |
|---|---|---|
| EP | 1010606 A1 | 6/2000 |
| EP | 1382518 A1 | 1/2004 |
| JP | 2013035295 A | 2/2013 |
| WO | 9915390 A1 | 4/1999 |
| WO | 2011026763 A1 | 3/2011 |

* cited by examiner

ROOF SEGMENT FOR A VEHICLE AND METHOD FOR PRODUCING A ROOF SEGMENT

CROSS-REFERENCE TO RELATED APPLICATION

This application claims priority to German Patent Application No. 1020150018086, filed Feb. 11, 2015, which is incorporated herein by reference in its entirety.

TECHNICAL FIELD

The present invention relates to a roof segment for a vehicle, particularly a motor vehicle. The invention further relates to a roof module that includes a roof segment and a vehicle equipped with the roof module or roof segment. The invention also relates to a method for producing said roof segment.

BACKGROUND

One of the greatest challenges facing Humanity today is global warming, the term used to characterise the rise in the average temperature of the near-earth atmosphere and oceans that has been observed since the middle of the 19th century. Studies have confirmed that there is a relationship between global warming and increasing carbon dioxide emissions. One process that causes the release of $CO_2$ is the burning of fossil fuels, so combustion engines used to power motor vehicles are responsible for the release of a significant proportion of $CO_2$ emissions. The motor vehicle manufacturers are working hard to find ways to reduce $CO_2$ emissions, these efforts also being mandated by legal regulations. In this context, reducing the weight of the motor vehicle as a whole is critically important, although the protection of passengers and pedestrians as well as torsional stiffness must not be neglected, but on the contrary should rather be further enhanced. In view of the increasingly stringent requirements regarding structural behaviour that are being imposed on vehicle bodies in terms of long-term durability, noise in the vehicle interior and driving comfort, it has become imperative to use alternative materials and material combinations, particularly in the area of the vehicle body. Besides the consideration of reducing the consumption of combustion materials or fuels by vehicles that rely on combustion engines, in electric motor cars increased range is a very important factor which is very closely associated with weight reduction.

SUMMARY

According to the herein described embodiments provided is a roof segment for a vehicle, particularly a motor vehicle, which results in a reduction in the overall weight of the vehicle and also lends the body additional torsional stiffness.

According to one of the herein described embodiments, the roof segment may include a flat base element with a wall, wherein the wall is constructed from a single starting material that has undergone plastic deformation and forms a closed hollow cross section.

The base element may have an approximately rectangular cross section along its longitudinal and transverse axes, with the result that the base element has a flat shape. In this context, the term "flat" is intended to indicate that the length and width of the base element are significantly greater than the height thereof. As a consequence, an upper and a lower wall section are formed, and the distance between them is relatively small, whereas the side wall sections are very short, and the distance between them is large. The term closed hollow cross section is understood to mean that there is at least one location in the base element where the wall is completely closed and encloses one or more cavities.

Known roof segments are produced from metal sheets consisting of a single layer, as is known for example from DE 10 2010 024 704 A1. To ensure that these metal sheets are able to contribute for the purpose of increasing the torsional stiffness of the body as a whole, they must have a relatively high wall thickness or be equipped with stiffening elements, which results in relatively heavy roof segments. Other known roof segments include two or more shells or troughs, which are attached to each other in such a way that they enclose a cavity. In order to attach the shells, however, connecting flanges must be provided, which in turn requires additional material. Furthermore, the shells must be positioned very precisely relative to each other when making the connection, which increases the assembly effort.

In contrast to the above, the roof segment according to the herein described embodiments is inherently very stiff due to its wall with the closed hollow cross section, which in turn results in greater torsional stiffness of the body as a whole. As a consequence, the walls can be made considerably thinner than those of the known, single-layer roof segments, so torsional stiffness is increased and at the same time weight is reduced. Thus, a way has been found to successfully alter the typically conflicting parameters of reduced weight and stiffness in such a way that both are increased. A further advantage of the herein described embodiments is that the roof segment can be manufactured from just a single starting material. Both assembly effort and material requirement can be reduced substantially compared with a roof segment that includes two or more shells. In most cases in the two shells construction method, the two shells are not identical, so strict attention must be paid to ensure that only matching shells are joined to each other. Since according to the described embodiments only a single starting material is needed, this problem no longer arises, with the result that logistics and manufacturing can be simplified.

It is advantageous that the starting material may be a single flat material with a first end area and a second end area, wherein the flat material is bent to create the wall and the two end areas are attached to each other structurally. The first and second end areas may be designed so that they can easily be attached to each other in such a way that the desired structure is created. In this context, the nature of the attachment is not limited in any way. For example, the two end areas be furnished with corresponding protrusions and recesses, which engage with each other to create a form-fitting connection. This serves to simplify the manufacture of the roof segment according to the described embodiments, and the additional cost of manufacture compared with known roof segments may be minimised, or the cost may even be reduced.

It is also expedient that the flat material for creating the wall is rollformed. With rollformed flat materials, it is very easy to produce profiles with cross sections that are almost if not completely constant over the entire longitudinal axis thereof. Because of this property, the rollforming process can be used particularly advantageously to create the wall, since the cross section of the base element hardly changes at all along the longitudinal axis, and accordingly it is not necessary to subject the roof segment to any major post-processing steps.

In a further variant, the first end area may have a first edge, and the second end area has a second edge, which edges extend substantially parallel to one another. The two edges may be attached to one another by means of an adhesive or rivets, for example. Unlike the solution in which protrusions engage in recesses, the two end areas can be joined directly without open joints. In this way, the operation of the roof segment according to the described embodiments can be simplified further. A substantially rectangular metal sheet may be used as the starting material so that the delivered sheet only has to be cut to the required dimensions if at all. Further preliminary work is not required.

It is expedient if the first end area and the second end area are joined to each other structurally by welding, particularly laser welding. After rollforming, a blank is obtained that already has a hollow cross section, but is not yet closed. The closed hollow cross section is not created until the end areas are joined structurally. Nowadays, welded joints can be made inexpensively and with sufficient precision by robots. To this end, it is particularly expedient if the two end areas both have two edges that extend parallel to one another. In addition, the welded joints can be designed such that are able to withstand high loads for long time.

It is also expedient if the starting material is a pellet that has been extruded to form the wall. Extrusion makes it possible to provide the base element with the closed hollow cross section directly, without the additional step of structural connection. It is true that the extrusion tool is somewhat more expensive than the tools needed to create a structural connection by welding, for example, but on the other hand the roof segment can be prepared with fewer processing steps and the quality thereof is more consistent, so the higher cost of investing in the extrusion tool is offset by the savings realised in high-volume production runs.

In a further variant, the base element is made from a lightweight metal material, particularly aluminium or magnesium, or an alloy containing lightweight metal materials. Alternatively, non-ferrous metals may also be used. These materials or the alloys made from them constitute a further significant contribution to weight reduction compared with pure steel without reducing the inherent stiffness of the roof segment. Moreover, they respond particularly well to plastic deformation, and higher degrees of bending can be achieved. Consequently, the roof segment can also be given more complex geometries without significantly increasing production costs.

In another form, the base element is furnished with a number of attachment sections for connecting the roof segment to adjacent components of the vehicle. The attachment sections may correspond at least partially with the adjacent components, so that the roof segment can be positioned definitively with respect to the adjacent components even during assembly, which in turn can help to simplify the assembly stage and increase the precision of the bodywork created thereby. The adjacent components may be the front or rear windscreen or the tailgate of a motor vehicle. However, it is also possible to attach adapters to the attachment sections, to function as a kind of adapter, so that special material or geometrical properties can be taken into account. For example, the adapter may be substantially U-shaped, and the open end serves as a mounting for the adjacent components.

In the attachment sections, the upper and lower wall sections can touch each other, resulting in a doubling of the material, which in turn increases the torsional stiffness of the roof segment. This may be necessary particularly for the roofs of station wagons (Kombis), MPV's (Multi Purpose Vehicles) or SUV's (Sport Utility Vehicles).

The base element further has a left and a right attachment section for fastening each roof segment to the side wall of the vehicle, wherein stamping zones extend between the left and the right attachment sections. The left and right attachment sections particularly serve to connect the roof segment to side walls of the bodywork and the vehicle. The stamping zones may be designed so that the upper and lower wall sections contact each other there, and a double of material is realised. The contact between the upper wall section and the lower wall section creates a certain adhesive force in the stamping zones, which in turn increases the torsional stiffness of the roof segment. The torsional stiffness can be increased further if bolts or rivets are provided within the stamping zones or if laser welding is carried out there to reduce the torsion of the roof segment. In general, an adhesive material may also be applied there to lower the torsion of the roof segment.

On the other hand, the stamping zones may be created by increasing the distance between the upper and lower wall sections, thereby creating a bulge. These may be used for attaching additional components, for example, and also have the effect of increasing torsional stiffness.

It is expedient, if the base element has connection zones for connecting additional components of the vehicle. Connection zones may be holes, protrusions, embossing, recesses or the like, with which components such as sunshades interior lights, handles etc. can be fastened to the roof segment. The provision of connection zones in the base element makes it easier to assemble these components later, since the connection zones to not have to be created while the vehicle is being assembled.

Herein described embodiments further relate to a roof module for a vehicle, particularly a motor vehicle, that has a roof segment according to any one of the variations described previously, and one or more components of the vehicle. The term roof module is intended to denote a structural unit that comprises other components as well as the roof segment, for example the headliner, the sunshades, the interior lights, handles etc. The roof module is a structural unit that can be pre-assembled, and is assembled before it is connected to the adjacent components on the vehicle body. The roof segment is much more easily accessible before adjacent components are attached, so assembly is simpler. It is also possible to have the roof module completely assembled by a subcontractor at a different site, so the production line only has to be modified slightly, if at all. Otherwise, the advantages and technical effects that were described with regard to the roof segment apply equally for the roof module. And, the roof segment may include attachment zones that are designed either for fastening a rear windscreen for a notchback vehicle or for attaching a tailgate for a hatchback vehicle.

A further aspect of the herein described embodiments relates to a vehicle, particularly a motor vehicle, that has a roof segment according to any of the previously described variants, or a roof module according to the previously described embodiment. The advantages and technical effects that were described with regard to the roof segment and roof module apply equally for the motor vehicle.

Embodiments of methods for producing a roof segment according to any of the previously described embodiments, may include: Plastic forming of a single starting material to produce a blank that has a wall with a hollow cross section, and Hot forming the blank to produce the flat base element.

The term "plastic forming" is used to refer to a deformation process that permanently changes the shape of the corresponding starting material. In this case, the starting material is plastically reshaped in such manner that a blank is created having a wall with a hollow cross section. This blank is then hot formed to yield the flat base element of the roof module.

Consequently, the roof segment according to the invention can be produced in two reshaping steps, with the result that production is considerably simpler than the process for constructing roof segments in shells. In particular, no shells have to be attached to each other and do not need to be aligned precisely with each other even before the joining operation. With hot forming it is possible to achieve high degrees of bending, so that the roof segment can be given complex geometries with significantly more effort.

In a further variant, a single flat product is used as the starting material and the blank is prepared by forming, particularly rollforming the flat product. Rollforming is an ideal process for producing large number of roof segments. A particular characteristic of the rollforming method is that it is very difficult, if not impossible, to modify the cross section along the longitudinal axis of the products produced thereby. However, since the cross section of the roof segment only varies insignificantly along the longitudinal axis of the vehicle, the rollforming method can be used particularly advantageously, since no major post-processing steps need to be performed on the roof segment. In addition, the preparation of the roof segment is made simpler by the fact that only one flat material is required, a metal sheet, for example. If the roof segment is to have a bulge about its longitudinal axis, this too can be prepared in the same rollforming step. If the roof segment is to have a bulge about the transverse axis, this can be created in a stretch-bending process for example.

The method is developed further in that the flat material has a first end area and a second end area, and these are joined to each structurally to form a closed hollow cross section. If the starting material is rollformed, a blank is produced that has the desired hollow cross section but is not yet closed. To close the hollow cross section, the end areas of the starting material or the wall must be joined to each other. With rollforming, a single flat material product may be used as the starting material, and is reshaped in such manner that the first and second end areas are arranged directly beside one another. Optionally, the flat product may be formed in such manner that the two end areas are arranged directly beside one another with a preloading force. Consequently, the structural connection of the two end areas can be carried out quickly, easily and without the need to overcome a force when making the connection.

In this context, it is expedient if the first end area and the second end area are structurally connected to one another by welding, particularly laser welding. Nowadays, welded joints can be made inexpensively and with sufficient precision by robots. To this end, it is particularly expedient if the two end areas both have two edges that extend parallel to one another. In addition, the welded joints can be designed such that are able to withstand high loads for long time.

It is also conceivable that a pellet may be used as the starting material, and is extruded to form a closed hollow cross section. Extrusion makes it possible to provide the base element with the closed hollow cross section directly, without the additional step of structural connection. It is true that the extrusion tool is somewhat more expensive than the equipment needed for rollforming and creating a structural connection by welding, for example, but on the other hand the roof segment can be prepared with fewer processing steps and the quality thereof is more consistent, so the higher cost of investing in the extrusion tool is offset by the savings realised in high-volume production runs. A particular characteristic of the rollforming method is that it is difficult, to modify the cross section along the longitudinal axis of the products produced thereby. However, since the cross section of the roof segment only varies insignificantly along the longitudinal axis of the vehicle, the extrusion method can be used particularly advantageously, since no major post-processing steps need to be performed on the roof segment.

It is further expedient if the step of hot forming the blank is carried out by high pressure forming. In this way, it is possible to apply both internal and external pressure forming. High pressure forming enables very high bending levels, greater than 250%. This enables a very high degree of freedom in the design step, so that very complex geometries can be created with the need to joint several components together for the same effect, which means that connection points or lines that add weight can also be dispensed with. It is also possible to achieve very high degrees of precision and reproducibility.

BRIEF DESCRIPTION OF THE DRAWINGS in the following, the invention will be explained in detail on the basis of embodiments thereof and with reference to the accompanying drawing. In the drawing.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
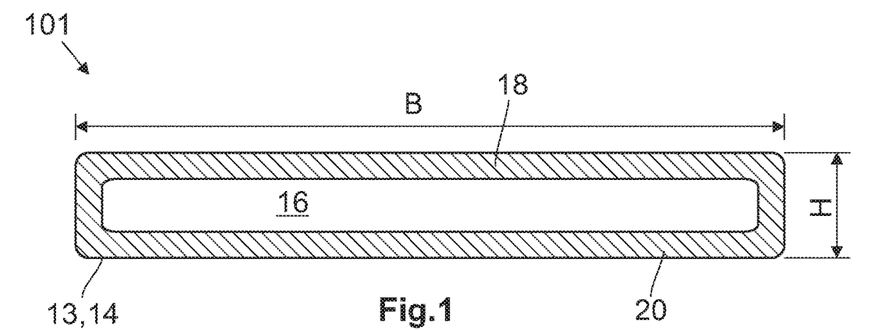
FIG. 1 shows a first embodiment of a blank, from which a roof segment can be produced.

FIG. 1 shows a first embodiment of a blank 101, from which a roof segment (see also FIG. 3 ff.) may be produced. Blank 101 has a flat base element 14 with a wall 13 that encloses a cavity 16. In this context, the term "flat" is intended to indicate that the length and width B of base element 14 are significantly greater than height H, so that the roof segment 121 made therefrom has a substantially rectangular cross section along its longitudinal axis L and transverse axis Q (see FIGS. 5 and 6). Consequently, wall 13 forms an upper wall section 18 and a lower wall section 20, with a relatively small distance between them. Blank 101 is produced by extrusion, so wall 13 is closed on itself and does not have any connecting sections, so a closed hollow cross section is created without any further processing steps.

Figure 2:
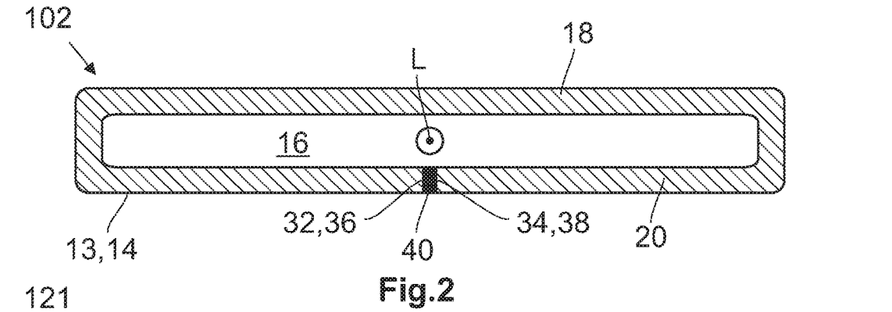
FIG. 2 shows a second embodiment of a blank.

FIG. 2 shows a second embodiment of the blank 102. It is substantially constructed in exactly the same way as the first embodiment, but blank 102 is manufactured by the rollforming method, wherein only single, suitable flat material such as metal sheet was used as the starting material. Consequently, wall 13 of base element 14 forms a first end area 32 and a second end area 34, which in the example shown have the form of a first edge 36 and a second edge 38, which extend essentially parallel to each other and along the longitudinal axis L of blanks 102 perpendicularly to the plane of the drawing in FIG. 2. The two end areas 32, 34 or the two edges 36, 38 are connected to each other structurally, in the example shown by means of a welding method, so a weld seam 40 is created.

Figure 3:
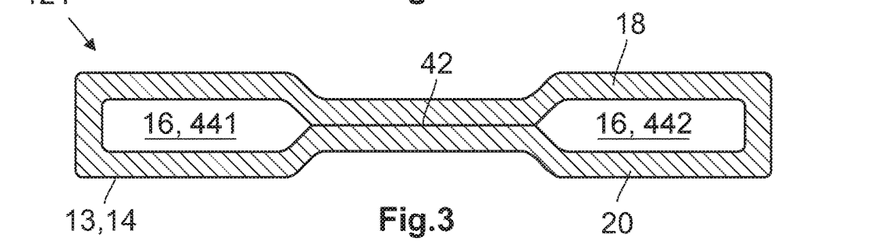
FIG. 3 shows a first embodiment of a roof segment.

FIG. 3 shows a first embodiment of the roof segment 121, which is produced from a blank 101 according to the first embodiment by an extrusion method. In a second shaping step, for example hot forming, and with the aid of high pressure, which in this embodiment is applied to wall 13 by external means via a medium such as water or oil in an appropriate tool (see FIG. 11), the upper wall section 18 and the lower wall section 20 may be moved toward one another until they are touching, and a stamping zone 42 is created. Alternatively, it is possible that upper wall section 18 and lower wall section 20 in stamping zone 42 touch each other as a result of a corresponding design of the extrusion tool. Stamping zone 42 may also be created by punches acting on wall 13 from the outside. In all cases, cavity 16 is divided into two sub-cavities 441, 442 by stamping zone 42, It is also conceivable for stamping zone 42 to extend over the entire roof segment 121, so that in this case no cavities 16 are formed. However, it is not necessary for the upper and lower wall sections 18, 20 to touch each other in the stamping zone. The formation of stamping zone 42 is advantageous for roofs of station wagons (Kombis), MPV's (Multi Purpose Vehicles) or SUV's (Sport Utility Vehicles).

Figure 4:
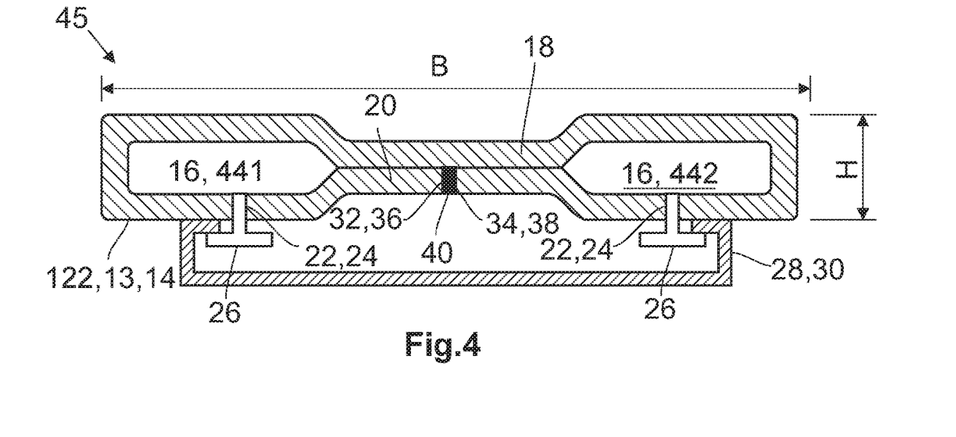
FIG. 4 shows a roof module comprising a second embodiment of a roof segment, each in a sectional representation.

FIG. 4 is a schematic representation of a roof module 45 including a roof segment 122 according to a second embodiment, which has been produced in a rollforming process, but otherwise has the same cross section as the first embodiment 121 shown in FIG. 3. However, because it is manufactured by the rollforming process, the second embodiment 122 also has first and second end areas 32, 34 and first and second edges 36, 38, in the same way as the blank 102 of FIG. 2, and these are connected by means of weld seam 40.

Roof segment 122 also comprises connection zones in this case holes 24, to accommodate fastening elements 26 such as bolts or rivets, with which further components 28 of a vehicle 74 (see FIG. 1) can be fastened to roof segment 122. In the example shown, the further component 28 is a headliner 30. Headliner 30 and roof segment 121 are essential components of roof module 45, which can be assembled before it is installed in vehicle 74. Alternatively, further component 28 may also be fastened directly to roof segment 121 via connection area 22 without the aid of a separate fastening element 26.

Figure 5:
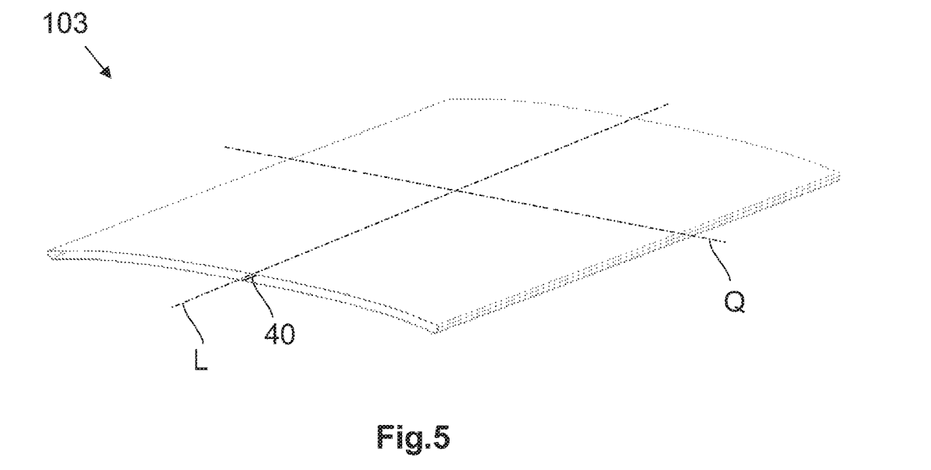
FIG. 5 shows a third embodiment of a blank in a first production state.

FIG. 5 is a perspective view of a third embodiment of the blank 103 in a first production state. It shows clearly that blank 103 is flat in structure, that is to say the extension thereof along longitudinal axis L and transverse axis Q is significantly larger than along its height axis, which is not shown here. It has been bent from a single, flat piece of material using a rollforming process, wherein the two end areas 32, 34 and the two parallel edges 36, 38 (see FIGS. 2 and 4) are connected to each other by means of a welding method, with the result that the third embodiment also has a weld seam 40. Blank 103 is slightly convex about longitudinal axis L, this curvature having been created during rollforming, but it is not convex about transverse axis Q.

Figure 6:
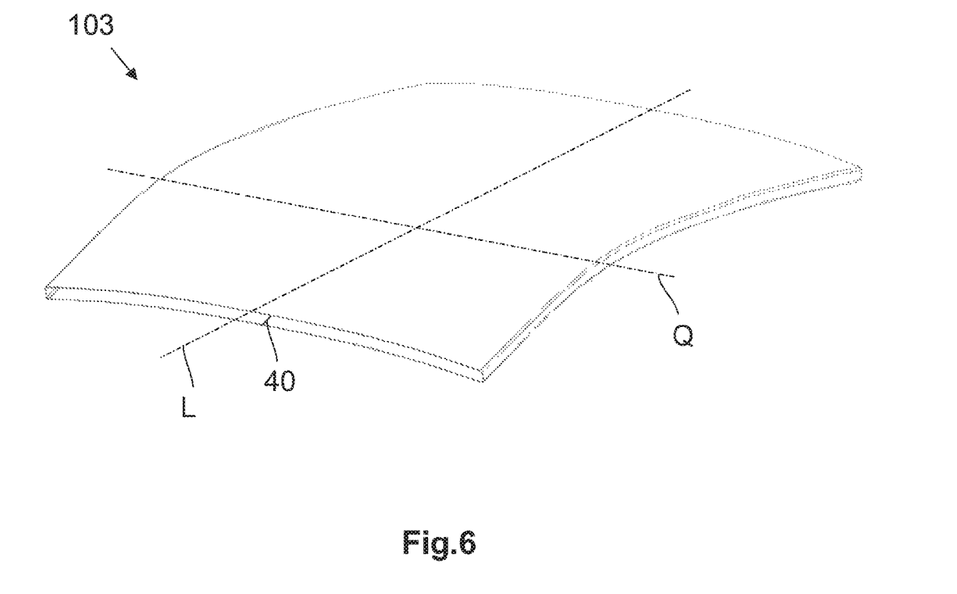
FIG. 6 shows the third embodiment of the blank in a second production state.

FIG. 6 shows the embodiment of the blank 103 shown in FIG. 5 in a second production state. Roof segment 121 is now also bent about transverse axis Q, this bending taking place in a stretch-bending process which follows the forming but is not illustrated further here.

Figure 7:
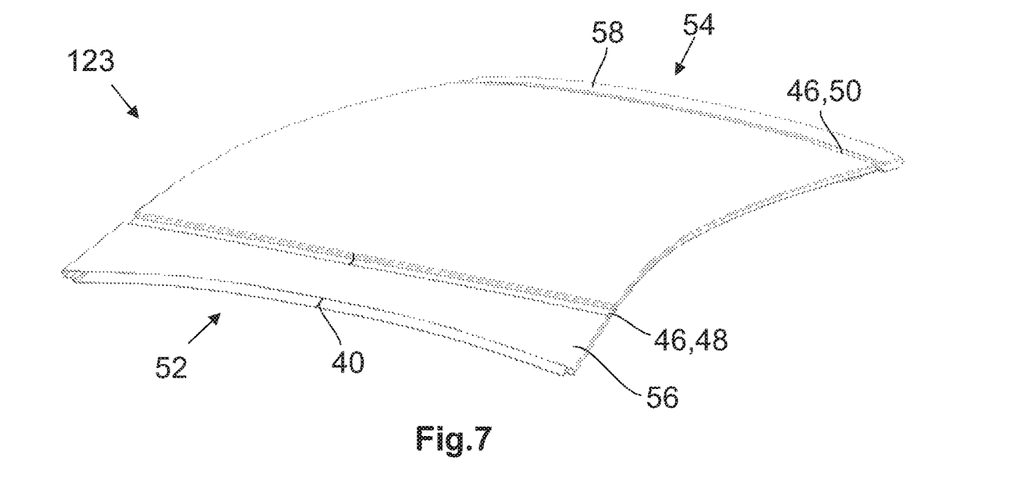
FIG. 7 is a top view of a third embodiment of the roof segment in an intermediate production state.

FIG. 7 is a view of a third embodiment of a roof segment 123 shown from a top left perspective. Roof segment 123 has been furnished with attachment sections 46, in the example shown with a front attachment section 48 and a rear attachment section 50, to which for example a front windscreen 76, and/or a rear window 78 may be attached (see FIG. 12) by means of a hot forming process and with the assistance of pressure that is applied to wall 13 by a medium. Upper and lower wall sections 18, 20 touch each other in attachment sections 46, so that the material is in double thickness here, with the result that roof segment 123 is stiffer in the attachment sections. This material doubling may be produced for example by punches acting on wall 13 from the outside (see FIG. 11).

For production-related reasons, however, front attachment section 48 and rear attachment section 50 do not form the front end 52 and rear end 54 of roof segments 123 in the third production state, but instead there is a certain distance between front end 52 and rear end 54, so a front adapter 56 and a rear adapter 58 are formed between front attachment section 48 and front end 52 as well as between rear attachment section 50 and rear end 54.

Figure 8:
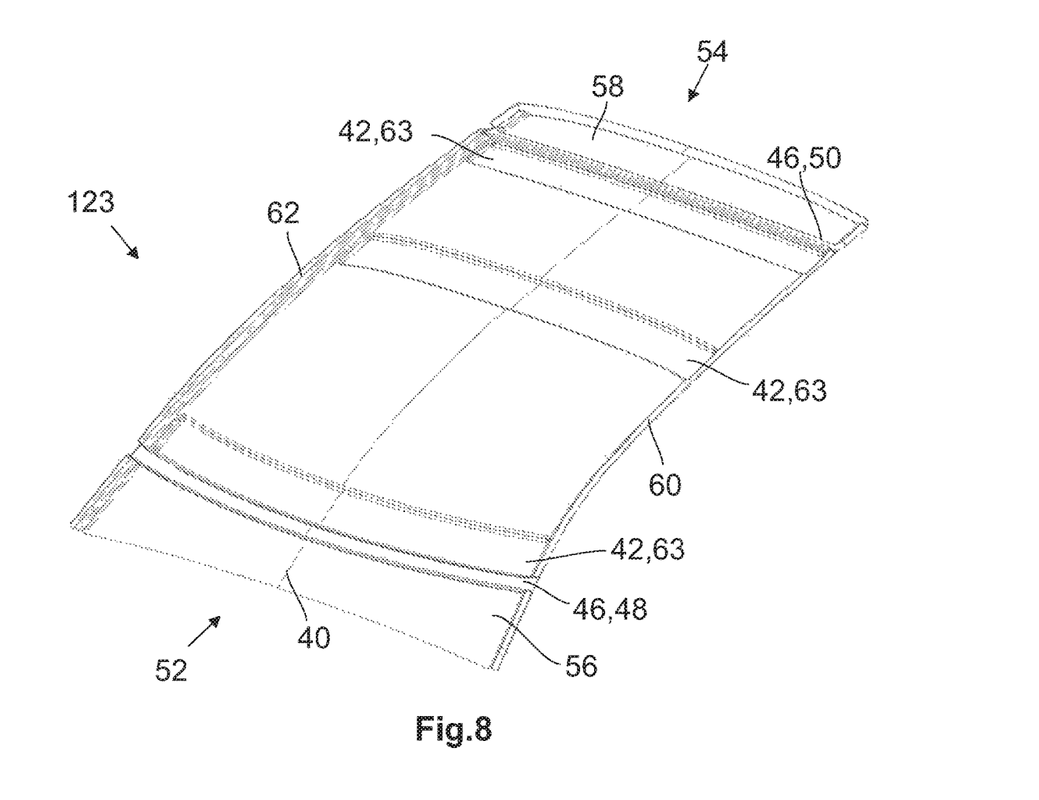
FIG. 8 is a bottom view of the roof segment of FIG. 7.

In FIG. 8, the roof segment 123 of FIG. 7 is shown from below. This shows that roof segment 123 has been provided with a left attachment section 60 and a right attachment section 62 by hot forming. Roof segment 125 can be connected to the side walls 80 (not shown here) of a vehicle 74 via left attachment section 60 and right attachment section 62 (see FIG. 12). Roof segment 125 has also been furnished by forming with two of the stamping zones 42, which extend between left attachment section 60 and right attachment section 62, and thus along the transverse axis (see FIGS. 5 and 6). In this case, however, upper and lower wall sections 18, 20 do not touch each other in stamping zone 42 but stamping zone 42 represents an outward bulge of lower wall section 18, so that the distance between wall sections 18, 20 within stamping zone 42 is increased.

Figure 9:
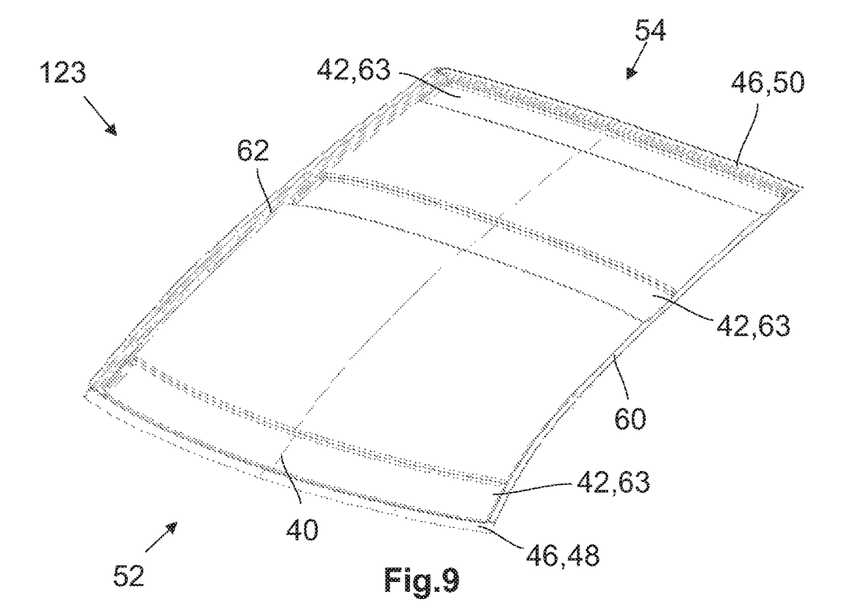
FIG. 9 shows the third embodiment of the roof segment in a production state.

In FIG. 9, the roof segment 123 of FIG. 8 is shown from the same perspective, but in this case front adapter 56 and rear adapter 58 have been separated from roof segment 123 in a separating step, so now front attachment sections 48 forms front end 52 and rear attachment section 50 forms rear end 54 of roof segment 123, and these are now closed, in contrast to the previous production states.

Figure 10:
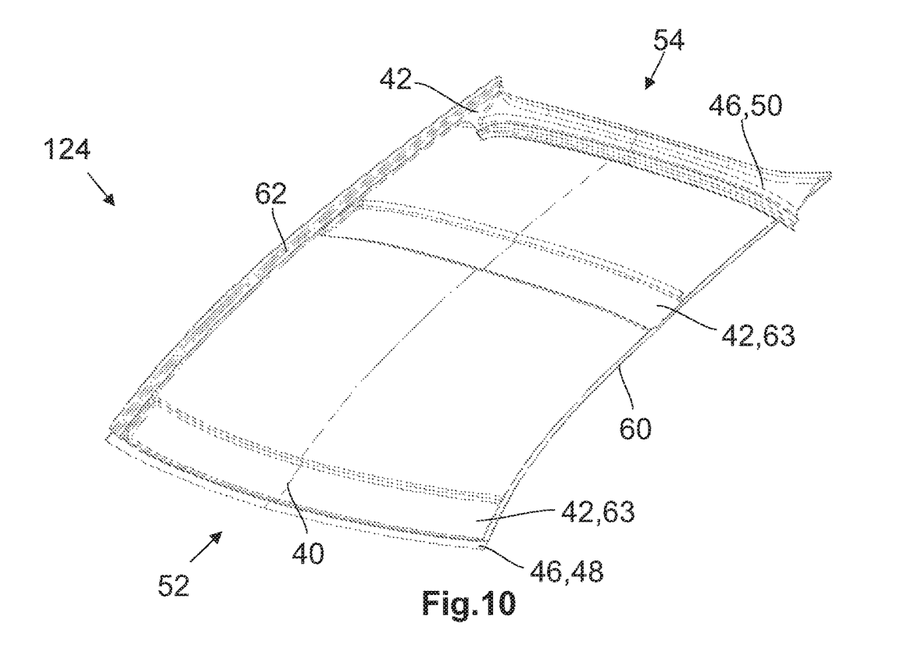
FIG. 10 is a perspective representation of a fourth embodiment of the roof segment in a production state.

FIG. 10 is a perspective view of a fourth embodiment of the roof segment 124. It is largely similar to the third embodiment, with the difference that rear attachment section 50 is designed such that a tailgate can be attached to roof segment 124 instead of a rear windscreen 78.

All embodiments of the roof segments 12 shown may be provided with additional components 28 of vehicle 74, as shown in FIG. 4, to create a roof module 45.

Figure 11:
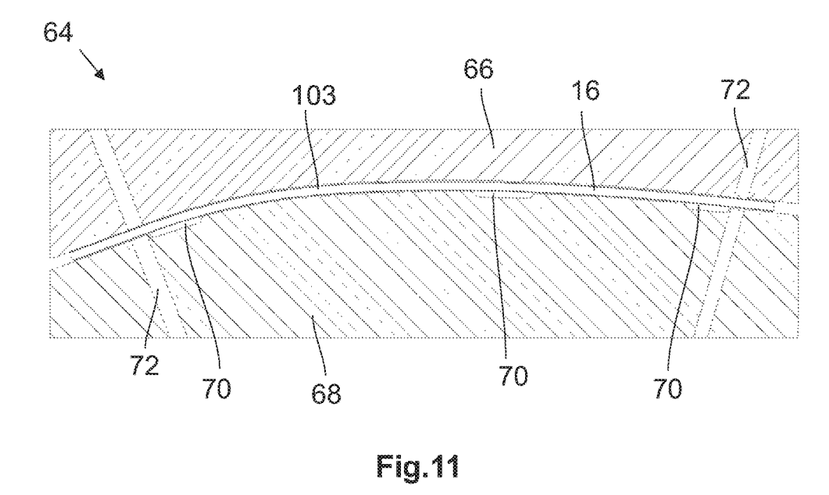
FIG. 11 shows a forming die for forming bending one of the roof segments represented in the preceding.

FIG. 11 shows a bending tool 64, in this case a hot forming die, with which blanks 10 can be bent to form a roof segment 12 according to one of the embodiments shown earlier. To this end, forming die 64 has an upper tool 66 and a lower tool 68, which are movable relative to each other. Lower tool 68 also has contours 70, with which stamping zones 42 can be produced. Lower tool 68 and upper tool 66 also have openings 72 through which sliders or punches (not shown) are guided.

Blank 103 is first warmed to a suitable temperature and then placed between upper tool 66 and lower tool 68. Then, upper tool 66 and lower tool 68 are moved toward each other, and forming die 64 is closed. This does not alter the convexity of blank 103. A medium, for example air and/or a water-oil emulsion, is introduced into cavity 16 of blank 103 under high pressure via feed lines (not otherwise shown), so that the pressure acts on wall 13 from the inside, and wall 13 is forced outwards in the area of contours 70 (internal high pressure forming). Alternatively, the medium may be introduced into contours 70 so that the pressure acts the wall 13 from outside in this case, wall 13 is pressed inwards in the area of contours 70 (external high pressure forming). Front and rear attachment sections 48, 50 are produced using the punches (not shown) that are applied to wall 13 through openings 72. In this case, upper and lower wall sections 18, 20 are moved toward each other until they touch each other in the attachment sections.

Figure 12:
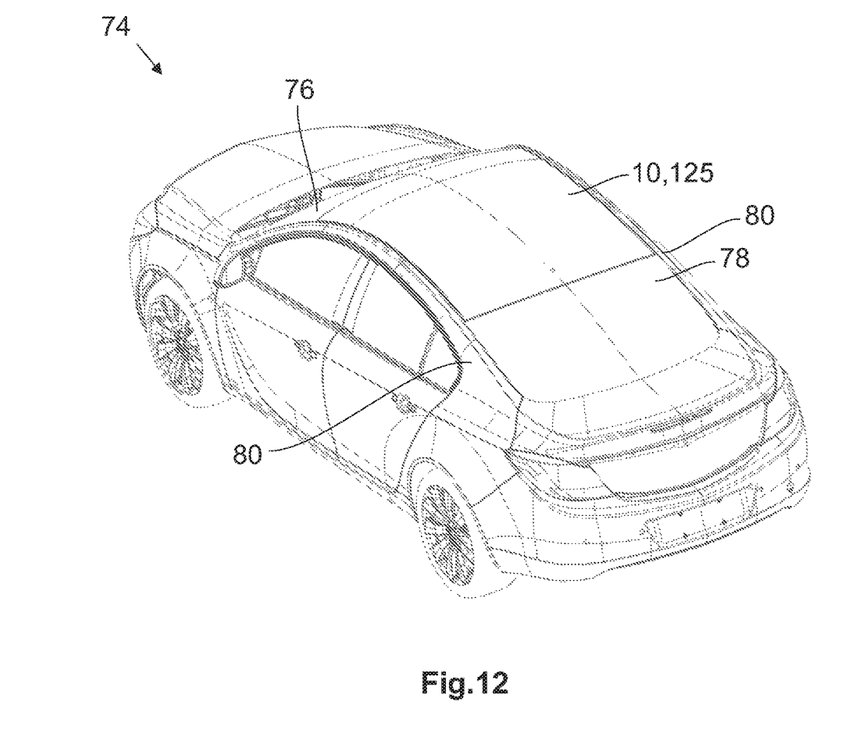
FIG. 12 shows a motor vehicle having a roof segment according to the third embodiment.

FIG. 12 shows perspective view of a vehicle 74 equipped with a roof module 45 that includes a roof segment 123 according to the third embodiment. The vehicle shown has a notchback with luggage compartment lid so that a front windscreen 76 is attached to roof module 45 via front attachment section 48, and a rear windscreen 78 is attached to roof module 45 via rear attachment section 50. Roof module 45 is also connected to side walls 80 of vehicle 74 via left attachment section 60 and right attachment section 62. A hatchback vehicle with a tailgate, which in this case is attached to rear attachment section 50 instead of rear windscreen 78 is not shown.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for producing a roof segment for a vehicle that has a front windscreen and a rear window, the method comprising:
    forming the roof segment as a flat base element with a wall configured to extend from the front windscreen to the rear window;
    forming the wall from a single, plastically deformed starting material;
    forming a closed hollow cross section; and
    enclosing one or more cavities with the wall.

2. The method according to claim 1 comprising:
    starting with the base element as a single flat material with a first end area and a second end area; and
    forming the wall from the single flat material so that the two end areas are structurally connected to each other.

3. The method according to claim 2 comprising rollforming the flat material to create the wall.

4. The method according to claim 3, wherein the base element has a longitudinal axis and comprising:
    forming the first end area with a first edge and the second end area with a second edge, which extend parallel to one another along the longitudinal axis; and
    welding the first edge to the second edge along the longitudinal axis.

5. The method according to claim 2 comprising connecting the first end area and the second end area to each other structurally by welding.

6. The method according to claim 3 comprising:
    connecting the first end area and the second end area to each other structurally by welding;
    forming a front attachment section across the roof segment, so that the front attachment section is configured to mate with the front windscreen; and
    forming a rear attachment section across the roof segment, so that the rear attachment section is configured to mate with the rear window.

7. The method according to claim 4 comprising:
    forming a front attachment section across the roof segment, so that the front attachment section is configured to mate with the front windscreen;
    forming a rear attachment section across the roof segment, so that the rear attachment section is configured to mate with the rear window; and
    connecting the first end area and the second end area to each other structurally by welding continuously from the front attachment section to the rear attachment section.

8. The method according to claim 1 comprising extruding a pellet to form the base element with the wall.

9. The method according to claim 1 comprising:
    forming the base element with a number of attachment sections; and
    forming a roof module prior to assembly of the roof module to the vehicle by fastening the roof segment to adjacent components of the vehicle including a headliner, using the attachment sections.

10. The method according to claim 1 comprising:
    attaching the front windscreen and the rear window of the vehicle to front and rear attachment sections of the roof segment; and
    attaching sidewalls of the vehicle at left and right attachment sections the roof segment.

11. The method according to claim 8 comprising:
    forming a front adapter across the roof segment adjacent the front attachment section;
    forming a rear adapter across the roof segment adjacent the rear attachment section; and
    separating the front and rear adapters from the roof segment before assembling the roof segment to the vehicle.

12. The method according to claim 10 comprising forming a roof module from the roof segment and from interior components including a headliner, prior to assembly of the roof module to the vehicle.

13. A method for producing a roof segment of a vehicle, the method comprising:
    plastic forming of a single starting material to produce a blank having a wall with a hollow cross section, and
    forming the blank to produce a flat base element configured to span a roof area of the vehicle from a front windscreen to a rear window, and from a left side wall of the vehicle to a right side wall of the vehicle.

14. The method according to claim 13, wherein a single flat material is used, and the blank is produced by rollforming of the flat material and comprising:
forming the blank with a front attachment section configured to attach to the front windscreen;
forming the blank with a rear attachment section configured to attach to the rear window;
forming the blank with a left attachment section configured to attach to the left side wall; and
forming the blank with a right attachment section configured to attach to the right side wall.

15. The method according to claim 14,
wherein the flat material has a first end area and a second end area, and comprising connecting the first and second end areas to each other structurally to form a closed hollow cross section.

16. The method according to claim 13,
comprising connecting the first end area and the second end area to each other structurally by laser welding.

17. The method according to claim 13, wherein a pellet is used as a starting material, and is extruded to form a closed hollow cross section.

18. The method according to any of claim 13, comprising hot forming the blank in a high pressure forming process.

19. A method for producing a roof segment for a vehicle having a roof area, the method comprising:
forming the roof segment from a single starting material as a base element with a wall so that the base element has a flat shape with a length and a width configured to substantially occupy the roof area of the vehicle in its entirety;
forming the wall from a single, plastically deformed starting material;
forming the wall to surround a cavity defining a closed hollow cross section, with an upper wall section on one side of the cavity and a lower wall section on an opposite side of the cavity from the upper wall section;
moving the upper and lower wall sections toward one another in a stamping zone that extends across the roof segment;
forming the base element with a front attachment section configured to attach to a front windscreen, wherein the upper and lower wall sections touch each other in the front attachment section;
forming the base element with a rear attachment section configured to attach to a rear window, wherein the upper and lower wall sections touch each other in the rear attachment section;
forming the base element with a left attachment section configured to attach to a left side wall of the vehicle, wherein the upper and lower wall sections touch each other in the left attachment section; and
forming the base element with a right attachment section configured to attach to a right side wall of the vehicle, wherein the upper and lower wall sections touch each other in the right attachment section;
forming a front adapter across the roof segment adjacent the front attachment section;
forming a rear adapter across the roof segment adjacent the rear attachment section; and
separating the front and rear adapters from the roof segment before assembling the roof segment to the vehicle.

20. The method according to claim 19 comprising assembling the base element in a roof module prior to assembly into the vehicle, the roof module including interior components of the vehicle including a headliner.

* * * * *